March 16, 1926.
T. MIDGLEY ET AL
CORE FOR TIRE VULCANIZATION
Original Filed Sept. 24, 1921
1,576,532
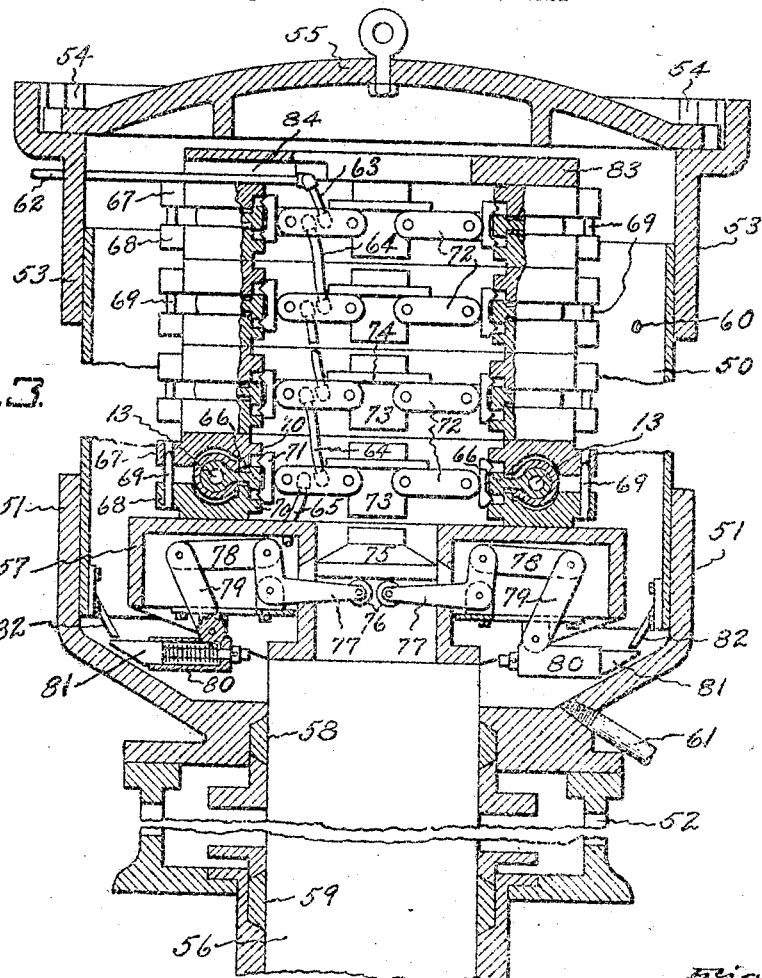
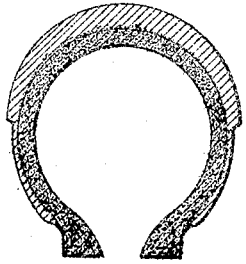
Fig.1.
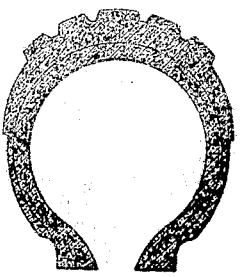
Fig.2.
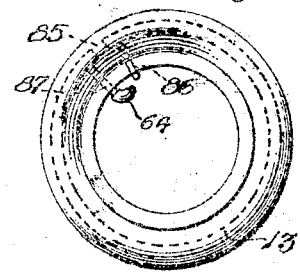
INVENTORS
Thomas Midgley
Ralph B. Taylor
by Edward W. Taylor
ATTORNEY.

Patented Mar. 16, 1926.

1,576,532

UNITED STATES PATENT OFFICE.

THOMAS MIDGLEY, OF HAMPDEN, MASSACHUSETTS, AND RALPH B. NAYLOR, OF PASADENA, CALIFORNIA, ASSIGNORS TO THE FISK RUBBER COMPANY, OF CHICOPEE FALLS, MASSACHUSETTS, A CORPORATION OF MASSACHUSETTS.

CORE FOR TIRE VULCANIZATION.

Original application filed September 24, 1921, Serial No. 503,020. Divided and this application filed September 10, 1925. Serial No. 55,420.

*To all whom it may concern:*

Be it known that we, THOMAS MIDGLEY, residing at Hampden, county of Hampden, State of Massachusetts, and RALPH B. NAYLOR, residing at Pasadena, county of Los Angeles, State of California, both being citizens of the United States, have invented certain new and useful Improvements in Cores for Tire Vulcanization, of which we declare the following to be a full, clear, and exact description.

This invention relates to improvements in cores on which tire casings are manufactured, and is a division of an application filed by us September 24, 1921, Serial No. 503,020, which claims a process of manufacture in which these cores are used.

For a more complete disclosure of the invention reference is made to the accompanying drawings, in which—

Fig. 1 is a sectional view of a tire casing in which the stippled portion represents in a general way the approximate degree of partial vulcanization which may be given to the tire casing while the heat is applied to it from the inside;

Fig. 2 is a like view but showing by the stippling how the tire may be completely vulcanized after the molds have been closed on the covering rubber and heat applied through them to the tire casing;

Fig. 3 is a sectional and detail view of a vulcanizing pot in which this particular species of invention can be carried out to advantage; and Fig. 4 is a plan view of the tire vulcanizing core used in carrying out certain features of the invention.

In Fig. 3 is shown a heater fitted up with means for maintaining separation of the mold members as long as desired, or until the regional or partial vulcanization through the carcass as indicated in Fig. 1 is completed.

The heater comprises a cylinder 50 mounted on a casting 51, supported on a foundation 52. To cylinder 50 is secured a head 53 with inwardly projecting lugs 54 under which a removable cover 55 is held. Movable through the foundation and the casting 51 is a hydraulic plunger 56, under which water pressure is introduced by any suitable means. A table 57 is carried on the flanged top of plunger 56. By controlling the water pressure under the plunger the table may be raised and lowered, and a pile of molds and tires placed on the table can be pressed with any desired force against the cover 55. Leakage of water past the plunger 56 is prevented by stuffing boxes 58 and 59. Provision is made, as by an inlet 60, and outlet 61, for furnishing compressed air, steam or water to the inside of the heater. All the above parts are old and well known in the art and need not be described further.

The tire casings are mounted on internally chambered ring cores. These cores may be the ones on which the casings were constructed. Hollow cores such as core 13, if the tire casing is of the type having inextensible beads, may be formed of a plurality of sections held together by suitable means in a well known manner. Provision is made for the circulation of steam through the several hollow sections by any suitable steam connections. If the tire casings are of the clincher or extensible type the hollow cores may be integral, having a partition wall 85 between adjacent inlet and outlet passages 86 and 87 for admitting steam or heating fluid to the interior.

Connection is made to the hollow interior of the cores through flexible pipes, as by an inlet pipe 62 connected to the top core by a short pipe 63. The chambers of the several cores are joined by flexible tubes 64, and the bottom core is connected to an outlet by a flexible tube 65. In this manner the connections of inlet pipe and outlet pipe to each core provides for a circulation in the cores. By this circulation the cores may be maintained at a desired temperature so as to apply heat to the interior of the tire casing while the outside of the casing is exposed.

Surrounding each core is a split mold composed of an upper section 67 and a lower section 68. These sections are guided relative to each other by dowels 69 fastened in the lower section and running in holes in the upper section. Each section has an inwardly projecting annular lug 70 by which the sections of each mold are held apart as will be described. The forming faces of the mold sections are shaped to give the desired form to the tire, and may be provided with the usual raised and depressed portions to give a design as indicated in Fig. 2, although such pattern has not been shown in Fig. 3.

Fitting between flanges 66 of the cores and lugs 70 of the molds are double wedges 71 which, when held outwardly, will hold the mold sections apart a distance, out of contact with the casing according to the design of the wedges 71, and will position the core midway between them. These wedges form part of what may be termed a toggle unit. One toggle unit is provided for each of the split molds, and preferably there are three wedges, equally spaced circumferentially, to each unit. Each wedge is pivoted by a pin to a pair of arms 72 which straddle an inwardly extending lug on the wedge. The other ends of these arms are pinned to a lug on head 73. Head 73 is provided with a flange 74 which serves as an abutment to prevent the arms 72 swinging upwardly beyond the position shown. In this position the arms are slightly higher than the line of their pivots on head 73, and hence, once they have been placed in this position, the pressure exerted by the mold sections on the wedges will prevent the arms swinging downwardly past the line of their pivots and the breaking of the toggle thus formed.

The thickness of head 73 is preferably such that, when the molds and toggle units are stacked on top of one another, a slight space will be left between adjacent heads as shown in the drawing. This is to allow the toggles to be broken one at a time by the mechanism about to be described. Running in a bearing in table 57 is a block 75, whose bottom rests upon rollers 76 at the ends of bell cranks 77, and whose top is arranged to abut against the lowest head 73. The other end of each bell crank 77 is connected by a link 78 to another bell crank 79 pivoted to the table 57. The lower end of bell crank 79 is formed into a tubular sleeve 80, in which runs a spring pressed pawl 81. The outer end of this pawl is adapted to engage a depending lug 82 attached to casting 51. When the parts are in the position shown in the figure, the pile of molds reaches nearly to the cover and in this type of heater the mold pressure for the final vulcanization is obtained by forcing the pile against the cover by the hydraulic plunger 56. As the plunger is raised the outer ends of pawls 81 catch under the lugs 82 and cause the inner ends of bell cranks 77 to be raised, thus raising the block 75. As this block abuts against the lowest head 73 the latter is raised, swinging toggle arms 72 past their dead center. When the toggle is thus broken the weight of the molds, piled on top of the bottom section of the lowest one, will force the wedges of that one inwardly, thus forcing the lowest head 73 upwardly until it impinges against the second from the bottom head. In this manner the breaking of the toggles proceeds successively from bottom to top of the pile. If desired the space between heads 73 may be decreased by thickening the heads enough to contact so that all the toggles will be broken substantially simultaneously by the raising of block 75, but the present construction is preferable in this instance where the molds are held out of contact with the casings, as it avoids heavy shock due to the simultaneous collapse of all the molds, which are very heavy. It will be noted that the molds may be collapsed and the vulcanizing pressure applied without removing the cover from the heater. This both saves time and avoids cooling of the molds and casings with consequent loss of heat and interruption in the vulcanizing process. Instead of using the mold manipulating means described the invention could be carried out by opening the heater and applying the molds to the casings by hand, or other ways. The apparatus described is for convenience.

A plate 83 with a cutaway portion 84 is placed on the top of the pile of molds to allow pressure to be exerted by the pile against the cover 55 without injuring the pipe 62.

On the descent of the plunger 56 pawls 81 will slip by lugs 82 on account of their spring mounting. If the plunger is raised with no molds upon it, or with a pile not reaching to the top of the heater, the pawls will be engaged by the lug as described and will break the toggles of whatever units are supported by the plunger, but will then tilt past the lugs and allow the plunger to ascend freely.

Having thus described our invention, we claim:

A tire vulcanizing core, a tubular annulus having a partition therein and having a continuous passage throughout its circumferential extent from one side to the other side of said partition, a fluid-inlet at one side of and adjacent to said partition, and a fluid-outlet at the other side of and adjacent to said partition, said fluid-outlet and fluid-inlet extending inwardly of the core, so that these fluid carrying elements extend between the beads of the tire casing when the core is in the casing, and so that the current of fluid can be effected substantially through the circumferential extent of the core for the purpose specified.

THOMAS MIDGLEY.
RALPH B. NAYLOR.